(12) United States Patent
Dürr et al.

(10) Patent No.: US 9,371,440 B2
(45) Date of Patent: Jun. 21, 2016

(54) METHOD FOR PRODUCING MODIFIED POLYAMIDE 6

(75) Inventors: Georg Dürr, Magden (CH); Alexander Herbst, Magden (CH)

(73) Assignee: Wingspeed AG, Magden (CH)

( * ) Notice: Subject to any disclaimer, the term of this patent is extended or adjusted under 35 U.S.C. 154(b) by 163 days.

(21) Appl. No.: 13/640,996

(22) PCT Filed: Apr. 13, 2011

(86) PCT No.: PCT/EP2011/055760
§ 371 (c)(1),
(2), (4) Date: Dec. 18, 2012

(87) PCT Pub. No.: WO2011/128352
PCT Pub. Date: Oct. 20, 2011

(65) Prior Publication Data
US 2013/0102701 A1    Apr. 25, 2013
US 2013/0338259 A9    Dec. 19, 2013

(30) Foreign Application Priority Data

Apr. 14, 2010   (EP) .................................... 10159952

(51) Int. Cl.
*C08K 7/24* (2006.01)
*C08G 69/16* (2006.01)
*C08K 3/00* (2006.01)
*C08K 7/00* (2006.01)

(52) U.S. Cl.
CPC . *C08K 7/24* (2013.01); *C08G 69/16* (2013.01); *C08K 3/0033* (2013.01); *C08K 7/00* (2013.01)

(58) Field of Classification Search
CPC . C08G 69/14–69/20; C08K 7/26; C08K 3/36; C08L 77/02
USPC ................................................ 528/323–326
See application file for complete search history.

(56) References Cited

U.S. PATENT DOCUMENTS

| | | | |
|---|---|---|---|
| 3,454,689 A | | 7/1969 | Garrison |
| 3,920,593 A | * | 11/1975 | Adama et al. .................. 521/54 |
| 5,013,786 A | | 5/1991 | Payne et al. |
| 5,973,105 A | | 10/1999 | Wiltzer et al. |
| 6,525,167 B1 | | 2/2003 | Mohrschladt et al. |
| 7,049,391 B2 | | 5/2006 | Gähr et al. |
| 2002/0002266 A1 | | 1/2002 | Buijs et al. |

FOREIGN PATENT DOCUMENTS

| | | |
|---|---|---|
| DE | 2102247 A1 | 7/1971 |
| DE | 4021393 A1 | 1/1992 |
| DE | 4100909 A1 | 7/1992 |
| DE | 4131908 A1 | 4/1993 |
| DE | 4202110 A1 | 7/1993 |
| DE | 19961972 A1 | 6/2001 |
| DE | 102005041966 A1 | 3/2007 |
| EP | 0378088 A2 | 7/1990 |
| EP | 0640650 A1 | 3/1995 |
| EP | 0688808 A2 | 12/1995 |
| EP | 0791618 A2 | 8/1997 |
| EP | 0847414 A1 | 6/1998 |
| EP | 1088852 A1 | 4/2001 |
| EP | 1165660 A1 | 1/2002 |
| EP | 1141089 B1 | 9/2002 |
| EP | 1322694 A1 | 7/2003 |
| EP | 1333049 A2 | 8/2003 |
| GB | 1328957 | 9/1973 |
| WO | WO 98/02481 A1 | 1/1998 |
| WO | WO 01/12678 A1 | 2/2001 |
| WO | WO 2004/041910 A1 | 5/2004 |

OTHER PUBLICATIONS

Yang et al (Preparation of polyamide 6/silica nanocomposites from silica surface initiated ring-opening anionic polymerization, eXPRESS Polymer Letters vol. 1, No. 7 (2007) 433-442).*
Pezzotti et al (In situ polymerization into porous ceramics: a novel route to tough biomimetic materials, Journal of Materials Science: Materials in Medicine 13 (2002) 783-787).*
Liu (Mesoporous Silica/Polymer Nanocomposites, Dissertation, Georgia Institute of Technology, Date available: Jan. 29, 2010, pp. 1-182).*
Asmus et al (Manufacture and bioactivity of tough hydroxyapatite/nylon hybrid composites, Adv. Composite Mater., vol. 11, No. 3, pp. 255-264 (2003)).*
PCT/EP2011/055760 Search Report and Written Opinion dated Mar. 1, 2012.
Amelingmeier, "Perlite," Römpp Online Version 3.35 E., http://www.roempp.com/prod/roempp.php, 3 pgs.
Dogan et al., "Some Physicochemical Properties of Perlite as an Adsorbent," *Fresenious Environmental Bulletin*, 2004;13(3b):251-257.

* cited by examiner

*Primary Examiner* — Rachel Kahn
(74) *Attorney, Agent, or Firm* — Mueting, Raasch & Gebhardt, P.A.

(57) ABSTRACT

The invention relates to a method for producing polyamide 6 wherein the polymerization of ε-caprolactam is performed in the presence of an inorganic material having an open pore structure. The polyamide 6 thus obtained has extremely high impact toughness and is simultaneously elastic.

12 Claims, No Drawings

METHOD FOR PRODUCING MODIFIED POLYAMIDE 6

This application is a National Stage application of PCT/EP2011/055760, filed on Apr. 13, 2011, which published on Oct. 20, 2011 as WO 2011/128352, and which claims priority to European Patent Application EP 10159952.0, filed on Apr. 14, 2010, which applications are hereby incorporated herein by reference in their entireties.

The present invention is directed to a method for producing modified polyamide 6, modified polyamide 6 obtained by means of this method, as well as molded articles, films, fibers and foams produced from this modified polyamide 6. In particular, the invention is directed to a method wherein polyamide 6 is produced in the presence of a porous inorganic material.

Polyamide 6 is one of the most important thermoplastic polymers and is characterized by high strength, stiffness and toughness; moreover, it exhibits good chemical resistance and processability. World-wide, about 4000 kilo tons of polyamide 6 are produced annually.

The majority of the polyamide production is used for synthetic fibers for textiles. Furthermore, it is used for the manufacture of almost unbreakable household articles as well as technical parts which have to meet high abrasion resistance requirements. Due to its resistance against lubricants and fuel at temperatures above 150° C., it is also used in the automotive industry for engine parts like intake systems, fuel lines, engine covers and the like.

It is known that polyamide 6 is formed by ring-opening polymerization of ε-caprolactam with water as a starter (EP1141089A1, EP688808B1, US 20020002266A1, WO2004041910A1 etc.).

It is also known that for reasons of equilibrium, polyamide 6 resulting from the polymerization of ε-caprolactam comprises about 11 to 13 percent by weight of oligomers and monomeric ε-caprolactam. Since both ε-caprolactam and oligomers are soluble in and extractable from water, the mechanical properties of the polyamide 6 are severely impaired. In order to avoid this, some additional expensive process steps are required (EP1322694A1, EP1165660A1, EP1333049B1, EP847414A1, WO2002026865A1 etc.).

The production of what is referred to as branched polyamides is one possibility of improving the mechanical properties of polyamide 6. For instance, DE4100909A1 describes the production of polyamides whose mechanical properties such as toughness or stress-strain behavior are improved by selective branching. However, the mechanical parameters of the thus produced polyamide masses are only slightly improved.

It is known from the pertinent literature that the morphology and the mechanical properties of thermoplastics are influenced by the addition of elastomers. The combination of polyamide 6 and elastomers is described in many patents:

Often, elastic polymers such as for example polyolefins even on basis of rubber are added to polyamide 6. For instance, the combination of polyamides and elastomeric polypropylenes is known from EP0640650B1 and DE4131908C. DE4202110A1 describes the production of a molding compound with high impact toughness by alloying the polyamide 6 with acid-modified EVA copolymers, which is done by melt-compounding. The disadvantage of these and similar processes lies, inter alia, in the difficulty of achieving a sufficiently even distribution of the elastomer phase in the polyamide matrix during the compounding step. Moreover, the resulting improvement of the mechanical characteristics of these composites is relatively poor.

The basic properties of polyamide 6 can be modified by the subsequent addition of inorganic additives. This specific optimization of the property profile is referred to as compounding and is mainly carried out by means of extruders (mostly co-rotating twin screw extruders, but also counter-rotating twin screw extruders and continuous kneaders). The reinforcement of polyamide 6 with glass fibers or mineral fillers such as calcium carbonate, talcum, silicic acid, layered silicates, $TiO_2$ etc., is very common.

The glass fiber reinforced polyamide 6 (see e.g. EP378088A2) shows a clear improvement in tensile strength and stiffness. Fields of application for glass fiber reinforced polyamide 6 include parts with a high degree of stiffness and notched impact strength (e.g. body parts for cars and bikes, electric tools). The glass fiber reinforcement improves these properties if the interfacial bond between the inorganic fiber material and the organic polyamide material are formed via a chemical reaction. For this purpose, the glass fibers are additionally treated with expensive organosilicon compounds as adhesion promoters (DE4021393A1).

The U.S. Pat. No. 5,013,786A and EP1088852B1 describe the mixing of end-condensed polyamide 6 with mineral powdered additives for reinforcement. The disadvantage is that it is difficult to achieve an even distribution of the finely dispersed filler. Analogously to the compounding with the glass fibers, the missing covalent bond between the mineral materials and the polyamide 6 matrix has to be facilitated by means of surface modification with aminosilanes. However, this chemical modification constitutes an additional process step which is time-consuming and costly (Example DE19961972A1).

A project of the University of Kaiserslautern (Institute for Composite Materials, 2002) for the production of a composite of polyamide 6 and nanoscale layered silicates describes significantly altered properties such as high stiffness of the composite in combination with an improvement of toughness and barrier properties. However, the specific wear rate of the thus reinforced composite is in a similar range as that of pure polyamide 6. In this case as well, this is probably due to the incompatibility of the hydrophilic inorganic material and the hydrophobic organic polymer matrix. Furthermore, the extrusion of the finely dispersed layered silicates has also been found to be very problematic.

DE102005041966A1 describes polyamides with high flame resistance and glow wire resistance which are achieved by the use of different additives (in particular P-containing compounds). In addition, optional fibrous reinforcement materials such as glass fibers and fillers such as alkaline earth carbonates and amorphous silicic acid for improving the polyamide properties are described which are added to the polymer melt either during polymerization or in a subsequent compounding process. The patent application is silent with respect to the mechanical properties of the polyamides.

It is the object of the present invention to provide an inexpensive method for the production of polyamide 6, characterized by extremely high impact toughness in combination with excellent elasticity and good thermal and chemical resistance. Another object of the invention is the provision of polyamide 6 with extremely high impact toughness, elasticity and temperature-resistance.

These objects are achieved by a method for the production of modified polyamide 6, wherein the polymerization of ε-caprolactam is carried out in the presence of an inorganic material with open pore structure, as well as a polyamide 6 obtainable by such a method.

As is known, polyamide 6 (also referred to as nylon-6, polycaprolactam or Perlon®) can be obtained from ε-caprolactam in the presence of some water, wherein ε-aminocaproic acid is formed as an intermediate:

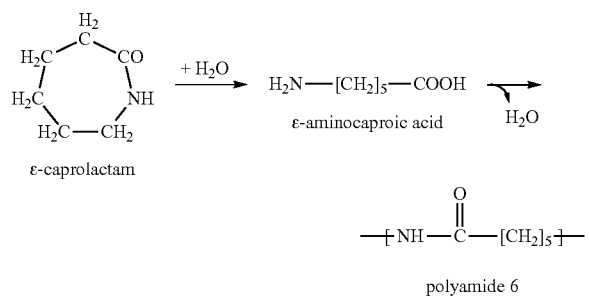

The method of the present invention is based on this known reaction, however, it is characterized in that the ring-opening polymerization of the ε-caprolactam is carried out in the presence of an inorganic material with open pore structure.

Preferably, a part of the ε-caprolactam is first dissolved in water to prepare a starter solution. Commercially available ε-caprolactam can be used as ε-caprolactam, or it can be prepared using common processes (e.g. by oximation of cyclohexanone with hydroxylamine sulfate and subsequent Beckmann rearrangement of the oxime in sulfuric acid oleum; alternatively, the cyclohexanone oxime can for example be obtained by photonitrosation of cyclohexane and subsequent rearrangement or cyclohexane nitration and partial hydration to form the oxime). The water content of the starter solution is 2-90 wt.-% based on the total weight of the starter solution, preferably 10-40 wt.-%, more preferred 15-30 wt.-%, particularly preferred 17-27 wt.-% and most preferred 20-24 wt.-%. The reaction is an endothermic reaction and can be accelerated, if desired, by short-term heating (e.g. for a time period of up to 5 minutes) to a temperature of 30-40° C. The ε-aminocaproic acid necessary for the chain initiation of the polymerization is formed in the hydrolytic ring-opening process.

The temperature of the starter solution is preferably held at 10-30° C., more preferred 15-25° C. The porous material is added swiftly and continuously until the entire porous material is suspended in the starter solution which again turns completely clear and transparent. After the addition has been completed, stirring is discontinued and the caprolactam and/or the aminocaproic acid are left to hydrolyze. Hydrolysis usually takes place at a temperature of 200 to 400° C., preferably 250 to 300° C. and more preferred 260 to 280° C. The reaction time of the hydrolysis is usually 0.1 to 10 h, preferably 0.5 to 5 h and more preferred 1 to 3 h. The system pressure during hydrolysis depends on the water content, but it is at most 5 MPa (50 bar). After completion of the hydrolysis, the system pressure is continuously lowered until it reaches 0.1 to 0.2 MPa (1 to 2 bar).

According to one embodiment, the polymerization is carried out in batches in an autoclave.

The inorganic material with open pore structure is added to the starter solution which is then added to preferably molten ε-caprolactam under vigorous stirring. Of the total amount of used ε-caprolactam, preferably 2-45 wt.-%, more preferred 5-27 wt.-% and most preferred 10-23 wt.-% are used for the preparation of the starter solution; the remaining amount of ε-caprolactam is preferably provided in the reactor in molten form.

The amount of water is preferably 0.5-10 wt.-%, more preferred 1-6 wt.-% and most preferred 2-4 wt.-% based on the total reaction mixture.

The polycondensation reaction is usually carried out at a pressure of 0 to 1 MPa (0 to 10 bar), preferably 0 to 0.5 MPa (0 to 5 bar) and more preferred 0.1 to 0.3 MPa (1 to 3 bar). The temperature in the reactor is preferably 200 to 400° C., more preferred 250 to 300° C. and most preferred 260 to 280° C. The dwell time is determined by the solution viscosity and is usually in the range of 1 to 5 h, in particular 2.5 to 3.5 h.

The polymerization can also be carried out continuously in a reactor cascade or a vertical tubular reactor. In this case as well, the porous material is preferably first mixed with a starter solution and the resulting suspension is then fed to the reactor or the cascade.

The inorganic material has an open pore structure, i.e. the pores are in contact with the surrounding medium. Additionally present closed pores (i.e. pores that are closed in themselves and do not allow a medium to penetrate) are possible but not necessary. The porous inorganic material can be characterized in more detail by the BET surface area, the pore volume and the average particle size.

The BET surface area determined according to ISO 9277 (1995) (details of the process are described below) is preferably 1 to 3000 m$^2$/g, more preferred 50 to 2000 m$^2$/g, particularly preferred 100 to 1000 m$^2$/g, most preferred 200-600 m$^2$/g.

As far as the pore volume is concerned (details of the process are described below), it is preferably 0.1 to 15.0 cm$^3$/g, more preferred 0.1 to 5.0 cm$^3$/g, particularly preferred 0.2 to 3.0 cm$^3$/g and most preferred 0.3 to 1.5 cm$^3$/g.

The average particle size $d_{50}$ (obtained from the particle size distribution determined according to ISO 1332.0 (2009), see below for details) is not particularly restricted, but it is preferably 0.5 to 500 μm, more preferred 0.7 to 50 μm and most preferred 1 to 6 μm.

Especially preferred materials have an average particle size $d_{50}$ of 1-6 μm, a pore volume in the range of 0.3 to 1.5 cm$^3$ and a BET surface area of 200-600 m$^2$/g.

The porous inorganic material is inert to the components present in the polymerization, i.e. it will not react with these components and will therefore not be chemically altered. The porous inorganic material is used in powder form and is solid at room temperature.

Suitable examples of porous inorganic materials include bentonite, aluminum oxide, kaolin, pyrogenic silicic acids, silicate-based aero gels, zeolites, activated charcoal and silica gels.

Silica gels, zeolites and activated charcoal are especially preferred porous inorganic materials. Silica gels and zeolites are more preferred and silica gels are most preferred.

The porous inorganic material is preferably added in an amount of 0.1 to 50 wt.-% based on the ε-caprolactam, more preferred 0.5 to 15 wt.-% and most preferred 1 to 10 wt.-%; an amount of 1 to 5 wt.-% is especially preferred.

Common additives such as anti-foaming agents, stabilizers, antioxidants etc. can be added to the reaction mixture in common amounts.

The special advantage of the polyamide 6 of the present invention lies in the extraordinarily firm bond between the polymer matrix and the reinforcement material, resulting in outstanding properties such as extremely high impact toughness in combination with excellent elasticity, as well as improved thermal and chemical resistance.

Without limiting themselves to any one theory, the inventors of the present invention suspect that due to the pores filled with ε-caprolactam, the particles of the porous inorganic material are incorporated into the polyamide matrix by polymerization. The backbone of the thus prepared polyamide composite is monolithic. It is suspected that the porous particles form physically bonded mechanical joints with the polyamide matrix which hold the polymer chains together tightly while imparting the extreme flexibility and pliability, which in turn dramatically increases the impact toughness and tensile strength parameters and improves the thermal and chemical resistance of the polyamide.

Fields of application of the thus produced polyamide 6 with high impact toughness, elasticity and thermal resistance include automotive engineering, mechanical engineering, civil engineering, and the like.

The polyamide 6 produced according to the present invention can be processed further to molded articles, films, fibers and foams using common methods; in particular, it can be processed by means of injection molding or extrusion molding. Examples of articles made from polyamide 6 according to the present invention include housing parts of machinery/equipment of all kinds, car body parts, general covering parts, general articles of daily use, household items, façade cladding, hinges for general industry and building industry applications, components for springs and joints. Special mention should be made of parts for cars and motorcycles, housing parts for household appliances and large appliances etc., produced by means of injection molding.

If desired, the polyamide 6 according to the present invention can be dyed with conventional dyes using known processes. For this purpose, the dyes can be added as early as the polymerization stage or they can be added during further processing e.g. by extrusion or kneading.

Measuring Methods

For modified polyamide 6:
Impact strength: according to Charpy, DIN EN ISO 179-1eU. (23° C.; dry)
Notched impact strength: according to Charpy, DIN EN ISO 179-1eA. (23° C.; dry)
In the notched bar impact test, a notched sample whose two ends rest on abutments is broken by one strike with a pendulum hammer. The speed of the hammer in the pendulum striking mechanism is 5 m/s. The impact energy required to fracture the sample divided by the sample diameter at the notch is referred to as notched impact toughness.
Tensile strength, tensile modulus of elasticity, elongation at break: according to DIN EN ISO 527-1 using tension bars after storage for 16 to 24 h at 23° C., testing rate 5 mm/min.
For Porous Materials:
The determination of the surface area according to BET and the pore volume is carried out according to ISO 9277 (1995) based on volumetric adsorption measurements with $N_2$ in the relative pressure range of 0 to 1 bar at 77.2 K. For this purpose, gaseous $N_2$ is gradually added to the porous materials in the sample container held at constant temperature. The amounts adsorbed are measured when an equilibrium was achieved between the adsorbate and the adsorptive. Based on the resulting adsorption isotherms, which express the adsorbed volume as a function of the relative pressure $p/p_0$, the total pore volume, the pore sizes, the internal surface and the BET surface area can be determined.

The entire specific surface area (BET surface area) is determined using the process suggested by BRUNAUER, EMMETT and TELLER (BET). The BET surface area is calculated by linearization of the adsorption data using the BET equation in the relative pressure range $p/p_0=0.05-0.3$.

The total pore volume is determined directly from the nitrogen isotherm at a relative pressure close to 1. The adsorbed amount of gas can be converted to a liquid volume via a conversion factor (with $(liq.N_2)=808.6$ kg/m$^3$ it is $1.5468 \cdot 10^{-3}$).

The particle size distribution is measured according to ISO 13320 (2009). The particle size is determined using the principle of laser diffraction wherein all the particles of a sample diffract the light of a monochromatic laser beam. Using complicated mathematical computations, the particle size distribution is calculated based on the angle-dependent light intensities. The value $d_{50}$ corresponds to the average particle size.

EXAMPLES

Example 1

Raw Materials Used:
solid ε-caprolactam,
water
silica gel with the following parameters: average particle size $d_{50}$ 1.5 μm, BET surface area 250 m$^2$/g, pore volume 1.4 cm$^3$/g Monomeric ε-caprolactam was provided in the autoclave. In a separate container, a 78% ε-caprolactam-water solution was prepared as a starter solution and subsequently 20 wt.-% silica gel (based on the 78% ε-caprolactam-water solution) was stirred into the starter solution at room temperature under constant stirring.

The freshly prepared suspension was slowly added by stirring into the molten ε-caprolactam in the autoclave at temperatures of about 120° C. The amount of water in the suspension was adjusted such that it amounted to 3.5 wt.-% based on the entire reaction mixture. The hydrolysis was carried out for 2 h at a product temperature of about 270° C. and a system pressure of about 0.5 MPa (5 bar). Following the decompression phase, wherein the system pressure was lowered by a slow and continuous removal of pressure, polycondensation was initiated at a product temperature of about 270° C. After a dwell time of 3.0 h, the finished polymer modified with 4 wt.-% (based on caprolactam used) silica gel was obtained, exhibiting the following parameters:
Tensile strength: 85.9 MPa,
Elongation at break 25.8±7.5%,
Tensile modulus of elasticity 3250±118 MPa,
Impact toughness (DIN EN ISO 179/1eU dry): no fracture (NB),
Notched impact toughness (DIN EN ISO 179/1eA. dry): no fracture (NB).

Example 2

Raw Materials Used:
solid ε-caprolactam,
water
Zeolite 13X as powder with the following parameters: average particle size $d_{50}$ 3.5 μm,
BET surface area 580 m$^2$/g, pore volume 0.3 cm$^3$/g.

Monomeric ε-caprolactam was provided in the autoclave. In a separate container, a 78% ε-caprolactam-water starter solution was prepared as in Example 1, and subsequently 15 wt.-% Zeolite 13X (based on the starter solution) were dispersed in the solution at room temperature under constant stirring.

The freshly prepared suspension was slowly added by stirring into the molten ε-caprolactam in the autoclave at temperatures of about 120° C. The amount of water in the suspension was adjusted such that it amounted to 4.0 wt.-% based on the entire reaction mixture. The hydrolysis was carried out for 2 h at a product temperature of about 275° C. and a system pressure of about 8 bar. Following the decompression phase, wherein the system pressure was lowered by a slow and continuous removal of pressure, polycondensation was initiated at a product temperature of about 275° C. After a dwell time of 3.0 h, the finished polymer modified with 3 wt.-% (based on caprolactam used) zeolite was obtained, exhibiting the following parameters:

Tensile strength: 75.3 MPa,
Elongation at break 20.7±6.6%,
Tensile modulus of elasticity 2930±45 MPa,
Impact toughness (DIN EN ISO 179/1eU, 23° C., dry): no fracture (NB),
Notched impact toughness (DIN EN ISO 179/1eA, 23° C., dry): 50 kJ/m$^2$ Comparative Examples

| Product | Manufacturer | Impact toughness DIN EN ISO 179/1eU (23° C.; dry) | Notched impact toughness DIN EN ISO 179/1eA (23° C.; dry) |
|---|---|---|---|
| Ultramid B3M6 (mineral reinforced PA6) | BASF | 190 kJ/m$^2$ | 9 kJ/m$^2$ |
| Ultramid B3ZG3 (glass fiber reinforced PA6) | BASF | 75 kJ/m$^2$ | 16 kJ/m$^2$ |

The polyamide 6 according to the present invention is characterized by unique impact toughness and notched impact toughness. The value "NB" according to Charpy DIN EN ISO 179/1eA could not be achieved with any known type of polyamide 6.

The method according to the present invention is more cost-efficient than the processes known from the prior art because it is a single-step process; all known and/or commercially available types of modified polyamide 6 are produced according to processes involving at least two steps; i.e. first, the polyamide 6 is produced from caprolactam and secondly, it is mixed with reinforcement materials such as glass fibers and the like.

The invention claimed is:

1. A modified polyamide 6, comprising:
an inorganic material having an open pore structure; and
polyamide 6 polymeric matrix,
wherein at least a portion of the polymeric matrix is within pores of the inorganic material, and
wherein the porous inorganic material, in the absence of the polymeric matrix, has a BET surface area determined according to ISO 9277 (1995) of 50 m$^2$/g to 3000 m$^2$/g, a pore volume determined according to ISO 9277 (1995) of 0.1 cm$^3$/g to 15.0 cm$^3$/g and an average particle size of 0.5 μm to 500 μm, and is inert to ε-caprolactam during polymerization of ε-caprolactam.

2. A method comprising:
molding a modified polyamide 6 according to claim 1 to produce an article, a film, a fiber or a foam.

3. A method according to claim 2, wherein the molding comprises injection molding and the article, film, fiber or foam is a component for a car, a motorcycle or a house.

4. A molded article, film, fiber or foam produced according to a method of claim 2.

5. The modified polyamide 6 according to claim 1, wherein the porous inorganic material is at least one selected from silica gels, zeolites, and activated carbon.

6. The modified polyamide 6 according to claim 1, wherein the porous inorganic material has a BET surface area determined according to ISO 9277 (1995) of 100 m$^2$/g to 1000 m$^2$/g.

7. The modified polyamide 6 according to claim 1, wherein the porous inorganic material has a BET surface area according to ISO 9277 (1995) of 200 m$^2$/g to 600 m$^2$/g.

8. The modified polyamide 6 according to claim 1, wherein the porous inorganic material has a pore volume determined according to ISO 9277 (1995) of 0.1 cm$^3$/g to 5.0 cm$^3$/g.

9. The modified polyamide 6 according to claim 1, wherein the porous inorganic material has a pore volume determined according to ISO 9277 (1995) of 0.3 cm$^3$/g to 1.5 cm$^3$/g.

10. The modified polyamide 6 according to claim 1, wherein the porous inorganic material has an average particle size of 0.7 μm to 50 μm.

11. The modified polyamide 6 according to claim 1, wherein the porous inorganic material has an average particle size of 1 μm to 6 μm.

12. The modified polyamide 6 according to claim 1, wherein the porous inorganic material has a particle size of 1-6 μm, a pore volume determined by ISO 9277 (1995) in the range of 0.3 cm$^3$/g to 1.5 cm$^3$/g and a BET surface area determined according to ISO 9277 (1995) of 200 m$^2$/g to 600 m$^2$/g.

* * * * *